(No Model.)  2 Sheets—Sheet 1.
E. W. VANDUZEN.
Steam Water Elevator.
No. 235,109. Patented Dec. 7, 1880.
Fig. 1.
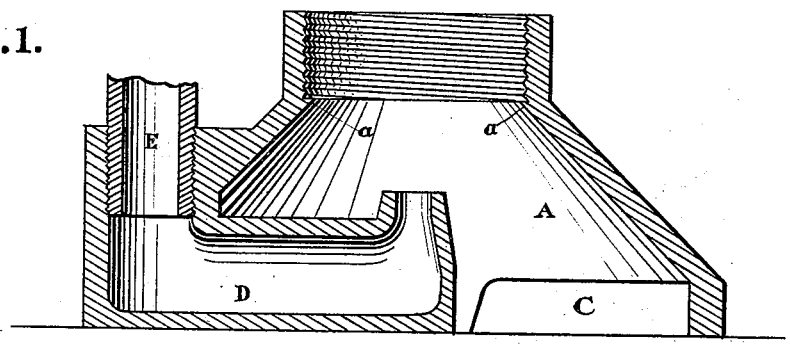
Fig. 2.
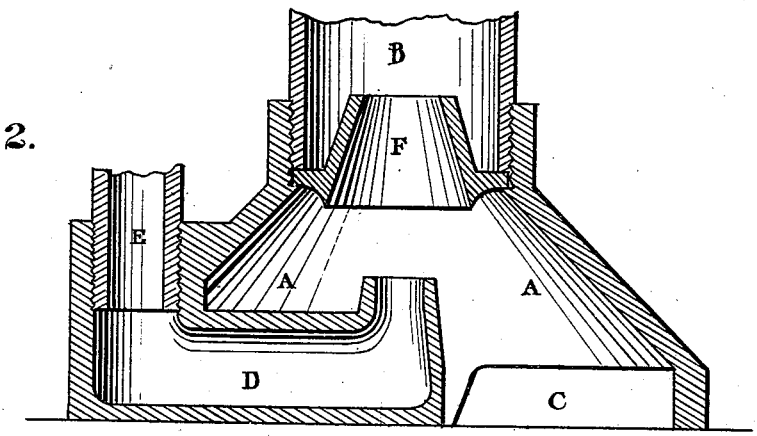
Fig. 3.
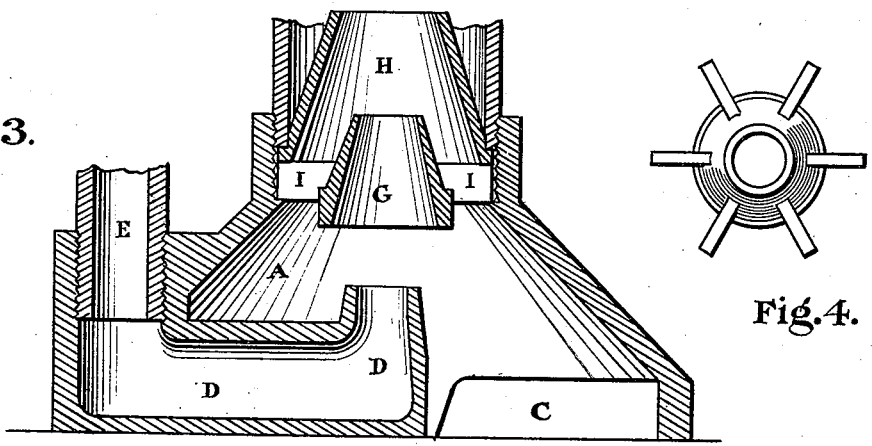
Fig. 4.
Witnesses:
Joseph Cox Jr
Wm. E. Mackelfresh
Inventor:
Ezra W. Vanduzen
By A. H. Ellsworth
His Attorney (No Model.) 2 Sheets—Sheet 2.

E. W. VANDUZEN.
Steam Water Elevator.

No. 235,109. Patented Dec. 7, 1880.

Witnesses:
Joseph Cox Jr
Wm. E. Mackelfresh

Inventor:
Ezra W. Vanduzen
By A. A. Allsworth
His Attorney

UNITED STATES PATENT OFFICE.

EZRA W. VANDUZEN, OF NEWPORT, KENTUCKY.

STEAM WATER-ELEVATOR.

SPECIFICATION forming part of Letters Patent No. 235,109, dated December 7, 1880.

Application filed August 20, 1880. (No model.)

*To all whom it may concern:*

Be it known that I, EZRA W. VANDUZEN, of Newport, in the county of Campbell and State of Kentucky, have invented certain new and useful Improvements in Steam Water-Elevators; and I do hereby declare the following to be a full, clear, and exact description of the same, sufficient to enable others skilled in the art to which my invention appertains to make and use it, reference being had to the accompanying drawings, forming part of this specification, in which—

Figure 6:
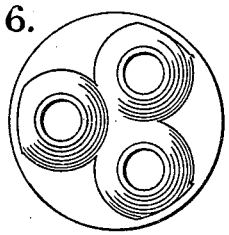
Figure 5:
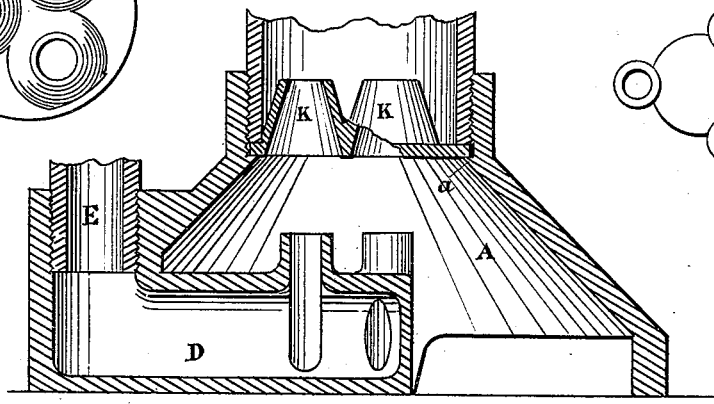
Figure 7:
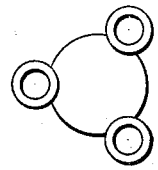
Figure 8:
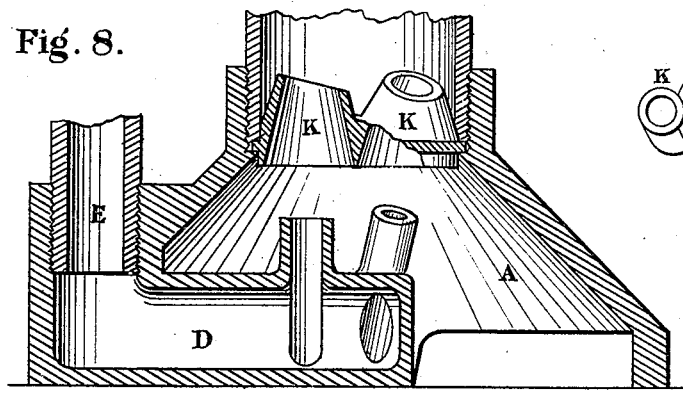
Figure 9:
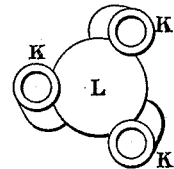

Figure 1 is a transverse vertical section of a pump constructed in accordance with my invention.
Fig. 2 is a like view, showing a supplemental discharge-nozzle. Fig. 3 is also a like view, showing a double nozzle. Fig. 4 is a top-plan view of the lower nozzle shown in Fig. 3. Fig. 5 is also a transverse vertical section of the pump, showing a modification in the form of the steam-jets and discharge-nozzle. Fig. 6 is a top-plan view of the discharge-nozzle shown in Fig. 5. Fig. 7 is a like view of the steam-nozzle shown in said Fig. 5. Fig. 8 is a sectional view of the pump, showing the steam and liquid nozzles inclined; and Fig. 9 is a top-plan view of the steam-nozzle shown in Fig. 8.

Similar letters of reference denote the same parts in the several figures of the drawings.

My invention relates to that class of steam blow-pumps employed for lifting and discharging water and other liquids from ships, steamboats, barges, &c., and is designed to attain a twofold object, to wit: First, to discharge all the liquid from the vessel instead of discharging only a part and leaving therein a considerable quantity, which the ejectors now in use cannot expel, and which, though perhaps only a few inches in depth, constitutes a large and heavy volume in steamboats and like vessels, obstructing their navigation and interfering with their freighting capacity; secondly, to operate effectively under a low pressure of steam, because the steam, having to be conveyed many feet from the boiler to the ejector, is reduced very greatly in pressure before being applied to lift the liquid. Hence excessive pressure is required at the boiler to operate the ejectors at present in use; whereas by my improvements ordinary pressure at the boiler will give sufficient pressure at the ejector to lift and discharge the liquid.

It has heretofore been considered necessary to construct pumps of this class with comparatively long steam-nozzles, for the purpose of accelerating and directing the steam into the throat of the discharge-pipe; and to obtain the requisite length the steam-nozzle is inserted through the side or top of the pump-barrel and then curved downward a considerable distance before being again turned up to or into the discharge-throat. This construction necessarily carries the throat a considerable distance above the bottom of the vessel to be drained, in order to make room for the curve of the pipe. As the point of action is at the throat of the pump and the lifting-force of the steam is only effective for a limited distance below the throat, the bend or curve of the steam-pipe generally necessitates the location of the throat so far above the extreme bottom of the pump that the escaping steam cannot act upon the liquid to be raised below a certain depth; therefore a considerable quantity is left in the vessel which the pump cannot eject. If the steam-nozzle is reduced to the minimum of the length heretofore deemed necessary, then the pump will, before all the liquid is ejected, draw in mingled liquid and air and become practically inoperative.

To remedy these objections, and make the pump effective for discharging all the liquid contents of the vessel, I have discovered that it should be made so shallow in depth as to carry the throat down toward the bottom or lower edge as far as possible; that the steam-nozzle should be so shortened as merely to give an upward direction to the escaping steam, and that therefore the steam should be introduced and practically applied at the very bottom of the pump to lift the liquid and completely drain the vessel.

In carrying out my invention I construct the body or shell A of the pump preferably in the general form of a truncated cone, having an inclination of about forty-five degrees, so as to carry the whole pump as near as possible to the bottom of the receptacle to be discharged. The body terminates at the top in a screw-threaded neck to receive the discharge-pipe B, and its lower edge is cast with recesses C for the entrance of the liquid. In addition to the supports afforded by the points between the recesses C the shell is further supported by the body D of the steam-nozzle, which is cast with the shell. The steam-nozzle stands a little below the discharge-throat of the shell, and is upturned only to the requisite extent for giving an upward direction to the steam into the throat. The object being, as above set forth, to place the operative parts of the pump as near as possible to the bottom of the vessel, it will be seen that the steam enters the nozzle substantially on a line with the lower edge of the body, and is discharged into the throat at the lowest possible point, and is therefore capable of lifting all the liquid that will flow or be drawn into the body through the edge openings C. Outside of the shell the body of the nozzle D turns upward, and is provided with a screw-thread to receive the steam-supply pipe E.

The second part of my invention, which consists in the adaptation of large and small pumps of the class named for operation at a comparatively low steam-pressure, I carry into effect by varying the form and capacity of their discharge-throats according to the size of the pump, whereby the velocity of the steam is proportioned to the work to be done.

Fig. 1 of the drawings shows the throat of the shell, made in the form and diameter of the discharge-pipe, which screws into it and rests upon the shoulder $a$. This shoulder is formed by continuing the inner bevel of the shell at the same angle, and hence does not impede the action of the steam-jet and the liquid lifted by it. This construction is best adapted for small pumps of one inch and less capacity, and requires only medium steam-pressure for effective operation. When, however, the size of the pump is increased, a deflecting-plate provided with a contracting central discharge-nozzle, F, may be set into the throat of the shell upon the shoulder $a$, and fastened in position by the discharge-pipe B, bearing upon it, as shown in Fig. 2. The plate and nozzle reduce and concentrate the steam-jet, thereby increasing its velocity and causing it to lift a column of water proportioned to the increased size of the pump.

The capacity of the pump may be still further increased by combining a double discharge-nozzle with the throat of the shell, as shown in Fig. 3, wherein G is the lower and inner nozzle and H the upper and outer nozzle. The one marked G is supported from the shoulder $a$ of the throat by radial arms I, so as to permit the upward flow of liquid around it, and the other, marked H, is supported upon the radial arms I, while both are fastened in place by the discharge-pipe, as above described. The lower nozzle divides the ascending column of liquid and directs it into the upper nozzle, thereby requiring only a low steam-pressure to lift a large quantity of liquid.

A further modification in the discharge mechanism consists in employing several steam-jets, as well as several water-jets, by forming the steam-nozzle with two or more branches, J, instead of a single discharge, and providing a corresponding number of separate cone-shaped discharge-nozzles, K, placed in the throat of the shell to register with the steam-jets, the nozzles being cast upon a plate held in the throat by the discharge-pipe, as shown in Fig. 5. The jets and nozzles J K may be parallel with the line of discharge, as shown in said figure, or they may be inclined thereto, as shown in Fig. 8, for the purpose of imparting a spiral motion to the liquid being discharged. I regard them as equivalents, however, although there may be some difference in their effect upon the force of the discharge.

The branched jets may be employed with their corresponding discharge-nozzles K, or they may be used in the pump without such nozzles; or two or more separate jets may be employed, with double discharge-nozzles placed one above the other, to operate upon the principle of the double nozzles shown in Fig. 3.

These various modifications mainly constitute changes in the form of the throat through which the liquid is ejected, and, as already shown, are applicable to pumps of the same general structure, differing only in size and capacity. They are therefore all included in the principle of my invention, which, in this respect, consists in adapting large and small pumps for discharging all the liquid contents of a receptacle at comparatively low steam-pressure.

Having thus described my invention, what I claim is—

1. A steam blow-pump consisting of the flattened shell A, constructed with a discharge-throat at the top and a steam-supply at the extreme lower edge, so as to carry the steam to the bottom of the pump, and having a short upturned jet, substantially as described, for the purpose specified.

2. A steam blow-pump consisting of the flattened shell A, having a recessed lower edge, a top discharge-throat, and a steam-nozzle entering horizontally at the bottom in line with the extreme lower edge, the whole comprising one casting, substantially as described, for the purpose specified.

3. The combination, with the flattened shell A, constructed with a steam-supply at the extreme lower edge, so as to carry the steam to the bottom of the pump, and having a short upturned jet, of one or more supplemental discharge-nozzles in the throat of the shell, substantially as described, for the purpose specified.

4. The combination, with the flattened shell

A, constructed with a steam-supply at the extreme lower edge, so as to carry the steam to the bottom of the pump, of one or more short upturned steam-jets, substantially as described, for the purpose specified.

5. The combination, with the flattened shell A, constructed with a steam-supply at the extreme lower edge, so as to carry the steam to the bottom of the pump, of two or more short upturned steam-jets and two sets of separate discharge-nozzles, each set being equal in number to the steam-jets, substantially as described, for the purpose specified.

6. The combination, with the flattened shell A, constructed with a steam-supply at its extreme lower edge, of two or more separate short upturned steam-jets and two or more discharge-nozzles in the throat of the shell, registering with the steam-jets, substantially as described, for the purpose specified.

The above specification of my invention signed by me this 31st day of July, A. D. 1880.

EZRA W. VANDUZEN.

Witnesses:
E. A. ELLSWORTH,
ALEX. BUCKINGHAM.